: 3,846,124
Patented Nov. 5, 1974

3,846,124
METHOD OF INCREASING THE CYANIDATION RECOVERABILITY OF GOLD FROM ORGANIC CARBON-CONTAINING GOLD-BEARING ORES
Wilbur J. Guay, Newtown, Conn., assignor to Newmont Exploration Limited, Danbury, Conn.
No Drawing. Filed Oct. 3, 1969, Ser. No. 863,692
Int. Cl. C22b 11/08
U.S. Cl. 75—112                                   3 Claims

ABSTRACT OF THE DISCLOSURE

The recoverability, by standard cyanidation, of the gold content of organic carbon-containing sedimentary gold-bearing ores is increased by slurrying the ground ore with water, charging chlorine gas to the slurry to the extent that the slurry will absorb the chlorine, and holding the thus-treated slurry for at least 6 hours while maintaining it at the chlorination treatment temperature of about 70–85° F.

---

This invention relates to the treatment of gold ores of sedimentary origin which are characterized by a significant content of organic carbonaceous material.

Sedimentary gold-bearing ores containing indigenous organic carbonaceous material are notoriously refractory to standard cyanidation treatment for the recovery of their gold content. Investigation into the cause of this problem has indicated that the carbonaceous material comprises active carbon and long-chain organic compounds. The active carbon appears to absorb the gold cyanide complex [$Au(CN)_2^-$] from cyanide leaching solutions, and the long-chain organic compounds appear to form stable complexes with the gold. In order to overcome this sequestering of the gold, experiments have been conducted by the United States Bureau of Mnies in which they used a wide variety of oxidation pretreatment systems including ozone, sodium hypochlorite, calcium hypochlorite, permanganates, perchlorates, chlorates and oxygen. Of these, the hypochlorites appeared to be the most effective, and although an elevated temperature was required it was found that temperatures above about 60° C. caused premature decomposition of the hypochlorites. Consequently, it was determined that a temperature within the range of 50° to 60° C. (122° to 140° F.) was required for effective hypochlorite treatment to render the gold component of the ore amenable to standard cyanidation treatment. At room temperature (about 70° F.), the hypochlorite treatment requires several days for the required reaction to make the gold content of the ore available for recovery by cyanidation.

I have now discovered that a wholly different reaction than that of a hypochlorite is capable of freeing the gold component of the aforementioned ores at a lower temperature and in a shorter time than a hypochlorite. Pursuant to the present invention, an aqueous slurry of the ore, in the absence of extraneous alkaline material, is maintained at a temperature within the range of about 70° to 85° F. while it is treated with as much chlorine as it will absorb and thereafter for a holding period of about 6 to 12 hours.

To prepare the aqueous slurry of the ore for treatment pursuant to the invention, the crushed ore is wet ground with water to about 60 wt. percent minus 200 mesh (Tyler standard screen) so that it will form a slurry with about 40 to 50% solids in water. No extraneous components are used in forming this slurry, including extraneous alkaline material, so that it will have a pH ranging between 6 and 10 resulting solely from the slurrying of only the ore with water, as distinguished from a pH of 11 or higher which prevails when such an ore is treated with a hypochlorite. If the resulting slurry at ambient temperature is not within the range of about 70° to 85° F., it is heated by any conventional means until it is at such a temperature, and preferably at a temperature between 75° and 80° F.

Chlorine gas is then dispersed through the slurry, advantageously by bubbling it into the bottom of the slurry mass by any conventional and appropriate device at a rate such that it will be substantially completely absorbed by the slurry. Generally, this bubbling of the chlorine into the slurry provides sufficient agitation to insure uniform exposure of the ore to the action of the chlorine, although additional mechanical agitation is advantageous. The reaction between the chlorine and the carbonaceous components of the ore takes place so rapidly that the pH of the slurry quickly drops to within the range of about 5 to 7. As this chlorination proceeds, there is evolved from the slurry a gas consisting primarily of carbon dioxide, nitrogen and oxygen. The rate of addition of the chlorine to the slurry is advantageously reduced as the pH of the slurry is lowered to a value within the range of about 5 to 7 and then is terminated when the slurry will no longer react with the chlorine, as evidenced by the presence of a significant amount of chlorine being evolved from the slurry even when it is added to the slurry at a low rate.

The thus chlorinated slurry is then held at the aforementioned reaction temperature, without further addition of chlorine and without any further treatment, for a period of at least 6 hours, and preferably for a period of between 6 and 12 hours. During this period, the reaction mass equilibrates with resulting passivation or alteration of the carbonaceous content of the ore so that it will not significantly sequester the gold content of the ore when the thus-treated ore is subsequently subjected to standard cyanidation. Where the ambient temperature during this holding period drops and would otherwise permit the temperature of the reaction mass to fall below the aforementioned range of 70° to 85° F., heat is added to the mass by any conventional means in order to hold the temperature of the mass within this range, and preferably within the range of about 75° to 80° F.

The following specific example is illustrative but not limitative of the practice of the invention. A random mass of organic carbon-containing sedementary gold-bearing ore from Carlin, Nev., which contained between about 0.2 to 0.4 ounce of gold per ton and from 0.9 to 4.3% total carbon (about 0.3 to 0.6% carbon in organic form), was crushed to minus 10 mesh (Tyler) and then was wet ground with water (60 wt. percent ore, 40% water, by weight) to yield an aqueous slurry containing the ore in approximately 60% minus 200 mesh particle size. The ground ore slurry or pulp was then transferred to an open vessel where it was continuously stirred while water was added so as to adjust the pulp to between 40% and 50% by wt. of solids. The temperature of the slurry was maintained at a temperature between 75° and 80° F. by steam addition. Gaseous chlorine was then bubbled into the lower portion of the slurry at a rate of 0.00025 cubic foot of chlorine per minute per pound of ore in the slurry. The chlorine was added at this rate for about 15 hours and then the rate of chlorine addition was progressively reduced during the next 9 hours at which time chlorine appeared in significant quantity in the gases evolved from the slurry. The thus-chlorinated slurry was maintained at the aforementioned temperature for about 10 hours with constant agitation to permit completion of the chlorination of the ore.

The pH of the chlorinated ore was then raised to above 7 by the addition of about 20 pounds of lime per ton of chlorinated ore and further treated by the addition of about 2 pounds of sodium cyanide per ton of ore pursuant to standard cyanidation procedure with resulting extraction of about 85% of the gold content of the ore. The same cyanidation of this ore without chlorination pursuant to the invention yielded only about 15% of the gold content of the ore.

I claim:

1. The method of treating sedimentary gold-bearing ore containing indigenous organic carbonaceous material so as to increase the recoverability of its gold content by standard cyanidation extraction which comprises slurrying the ore with water in the absence of extraneous alkaline material, adjusting the temperature of the slurry to about 70° to 85° F., and dispersing chlorine gas throughout the slurry at a rate and for a period of time such as the slurry will continue to absorb the chlorine with evolution of carbon dioxide, nitrogen and oxygen as the chlorine reacts with the organic carbonaceous components of the ore and only until a significant amount of chlorine gas is liberated from the chlorinated slurry, and maintaining the temperature of the thus-chlorinated slurry within the range of about 70° to 85° F. for a period of about 6 to 12 hours with the resulting production of a slurry-solids content in which the gold component is amenable to at least 75 wt. percent extraction by standard cyanidation practice.

2. The method according to claim 1 in which the slurry temperature is adjusted to and maintained between about 75° and 80° F. preceding, during and following its chlorination.

3. The method according to claim 1 in which the rate of introduction of chlorine into the slurry is progressively decreased as the pH of the slurry approaches about 7.

References Cited
UNITED STATES PATENTS

| | | | |
|---|---|---|---|
| 636,114 | 10/1899 | Cain et al. | 75—105 |
| 692,634 | 2/1902 | Davis | 75—105 |
| 1,071,791 | 9/1913 | Pugsley | 75—112 |
| 3,574,600 | 4/1971 | Scheiner et al. | 75—105 |

OTHER REFERENCES

Merck Index, Seventh Edition, Merck & Co., New Jersey, 1960, p. 548.

Schlesinger, General Chemistry, 4th Edition, Longmans, Green and Co., New York, 1953, pp. 422–3.

GEORGE T. OZAKI, Primary Examiner

U.S. Cl. X.R.

75—101 R, 105, 118